US006744741B1

(12) United States Patent
Ju et al.

(10) Patent No.: US 6,744,741 B1
(45) Date of Patent: Jun. 1, 2004

(54) SYSTEM AND METHOD FOR MAINTAINING A PLURALITY OF MEDIA CONFERENCES

(75) Inventors: Ken J. Ju, Cupertino, CA (US); Tien-Yi Lin, Fremont, CA (US); Steven Chow, San Carlos, CA (US); Joseph C. Harrow, San Ramon, CA (US); Son H. P. Le, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/464,069

(22) Filed: Dec. 15, 1999

(51) Int. Cl.[7] ............................................... H04L 12/16
(52) U.S. Cl. ...................................... 370/260; 370/264
(58) Field of Search ................................ 370/260, 261, 370/262, 263, 264, 266, 420, 421, 463, 419; 379/202, 203, 204, 205, 206

(56) References Cited

U.S. PATENT DOCUMENTS

| 4,665,514 A | | 5/1987 | Ching et al. ................. 370/60 |
|---|---|---|---|
| 4,771,425 A | | 9/1988 | Baran et al. ................. 370/85 |
| 4,819,228 A | | 4/1989 | Baran et al. ................. 370/85 |
| 4,903,261 A | | 2/1990 | Baran et al. ................ 370/94.2 |
| 5,495,522 A | * | 2/1996 | Allen et al. ............. 379/202.01 |
| 5,524,110 A | | 6/1996 | Danneels et al. ............. 370/62 |
| 5,526,353 A | | 6/1996 | Henley et al. ............. 370/60.1 |
| 5,742,772 A | * | 4/1998 | Sreenan ...................... 709/226 |
| 5,841,763 A | * | 11/1998 | Leondires et al. .......... 370/260 |
| 5,920,546 A | * | 7/1999 | Hebert et al. ............... 370/260 |
| 6,081,513 A | * | 6/2000 | Roy ........................... 370/260 |
| 6,091,714 A | * | 7/2000 | Sensel et al. ............... 370/260 |
| H1860 H | * | 9/2000 | Asthana et al. ................ 379/9 |

OTHER PUBLICATIONS

Cisco Systems, "System Description for the Cisco Communications Network," Version 2.1, 3 pages, Jan. 1999.

* cited by examiner

*Primary Examiner*—Wellington Chin
*Assistant Examiner*—William Schultz
(74) *Attorney, Agent, or Firm*—Baker Botts L.L.P.

(57) ABSTRACT

A system for maintaining a plurality of media conferences includes digital signal processors (DSPs) and a system resource management (SRM) module coupled to the DSPs. Each DSP receives input data packets from conference participants, processes the input data packets to generate output data packets, and communicates the output data packets to the conference participants. The SRM module may migrate a media conference from a first DSP to a second DSP.

80 Claims, 6 Drawing Sheets

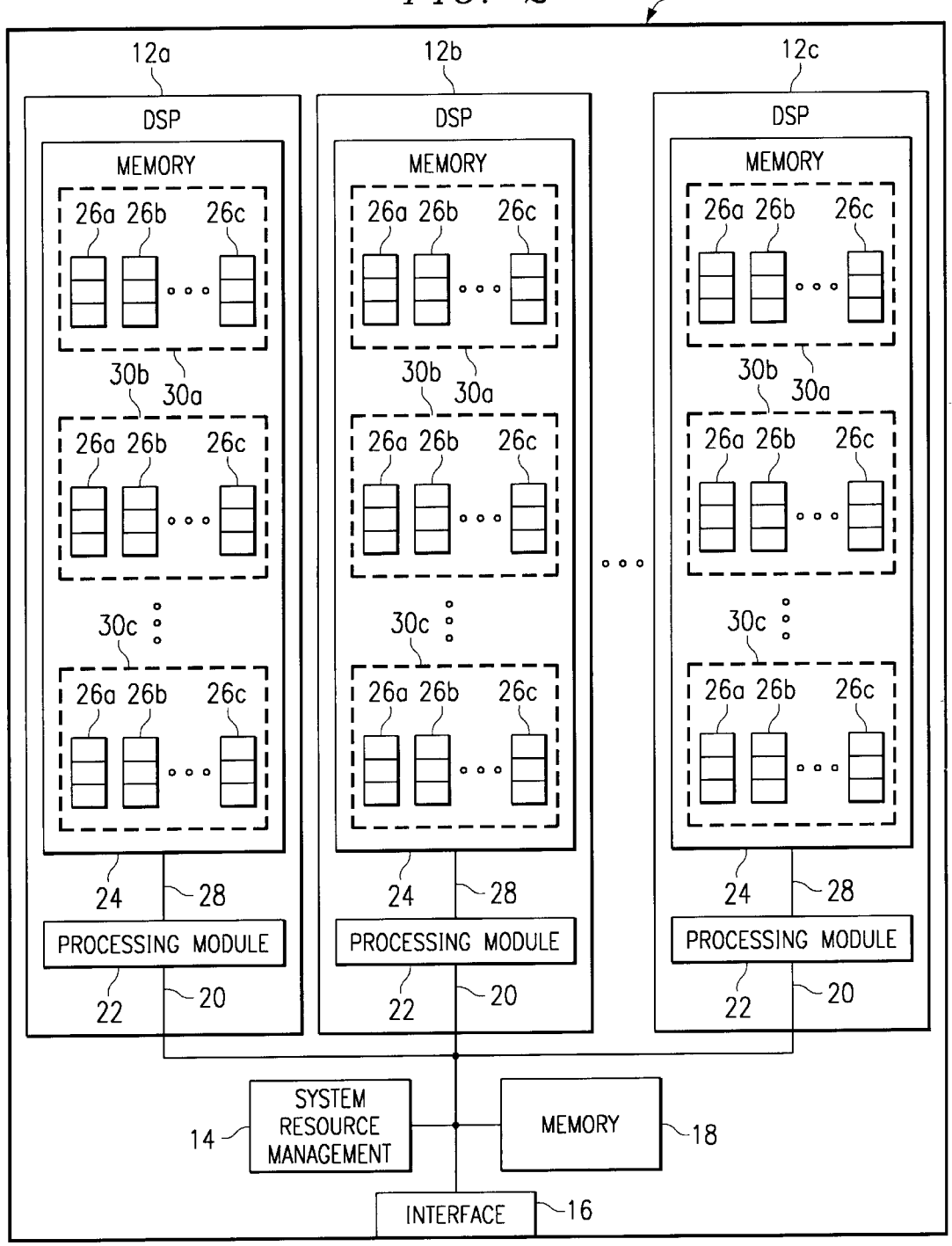

| MEDIA CONFERENCE IDENTIFIER 32 | PARTICIPANT IDENTIFIERS 34 | DSP IDENTIFIER 36 | PROCESSING INFORMATION 38 | MEMORY INFORMATION 39 |
|---|---|---|---|---|
| 1 | 15.2.48.147<br>163.45.87.2<br>222.154.2.14 | 1 | 25 | 30% |
| 4 | 12.69.158.3<br>35.79.2.198<br>63.58.158.6<br>96.68.75.15 | 2 | 45 | 40% |
| ⋮ | ⋮ | ⋮ | ⋮ | ⋮ |
| 2 | 6.8.45.168<br>15.26.254.2<br>69.36.147.3<br>154.68.57.64<br>185.21.35.167<br>224.36.56.98 | 1 | 70 | 55% |

*FIG. 3*  30

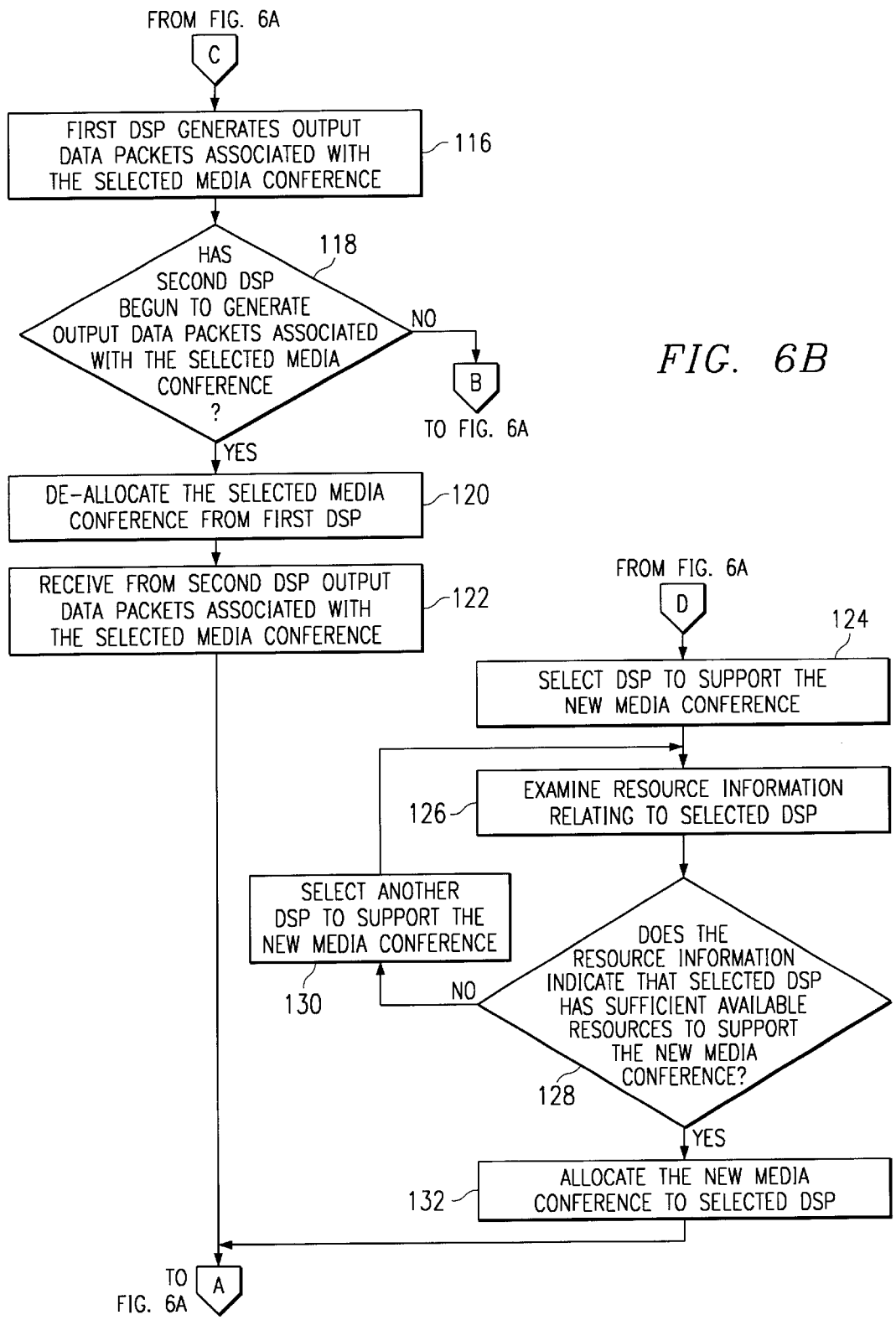

SYSTEM AND METHOD FOR MAINTAINING A PLURALITY OF MEDIA CONFERENCES

TECHNICAL FIELD OF THE INVENTION

This invention relates to the field of telecommunications and, more particularly, to a system and method for maintaining a plurality of media conferences.

BACKGROUND OF THE INVENTION

Many hardware and software applications use digital signal processors (DSPs) to process real-time data communicated over packet-based networks. These applications typically receive input data packets from end-user devices, process the input data packets to generate output data packets, and communicate the output data packets to the end-user devices.

Unfortunately, applications that manipulate real-time data require a minimum amount of memory, processing, or other resources for the communication and processing of the data packets to appear transparent to users. Once the applications allocated to a DSP exhaust the DSP's available resources, current systems restrict the dynamic growth of the applications to prevent performance degradations. For example, devices that process media conferences do not allow media conferences to add new participants if the DSP supporting the media conferences lacks the available resources to support the new conference participants. Hardware and software developers need a system that supports the dynamic nature of many real-time applications, such as media conferencing.

SUMMARY OF THE INVENTION

In accordance with the present invention, a system and method for maintaining a plurality of media conferences is provided that substantially eliminates or reduces disadvantages or problems associated with previously developed systems and methods.

In one embodiment, a system for maintaining a plurality of media conferences includes digital signal processors (DSPs) and a system resource management (SRM) module coupled to the DSPs. Each DSP receives input data packets from conference participants, processes the input data packets to generate output data packets, and communicates the output data packets to the conference participants. The SRM module may migrate a media conference from a first DSP to a second DSP.

Technical advantages of the present invention include a system and method for maintaining a plurality of media conferences. By migrating a media conference from a first DSP to a second DSP, the SRM module may free processing, memory, or other resources that the first DSP may use to support new media conferences or new participants in existing media conferences. As a result, new participants may join a media conference allocated to the first DSP without degrading the real-time quality of the media conference. In addition, by avoiding predetermined and fixed limits on the number of participants that may join a media conference and the number of conferences that may be allocated to each DSP, the SRM module improves the DSPs' resource utilization. Other technical advantages are readily apparent from the attached description, figures, and claims.

BRIEF DESCRIPTION OF THE DRAWINGS

For a more complete understanding of the present invention, and further features and advantages, reference is now made to the following description, taken in conjunction with the accompanying drawings, in which:

FIG. 2 illustrates a conferencing device for processing media conferences;

FIG. 3 illustrates a table that includes status information and resource information relating to DSPs in the conferencing device;

FIGS. 6A and 6B illustrate a flowchart of a method for allocating media conferences among DSPs.

DETAILED DESCRIPTION OF THE DRAWINGS

Figure 1:
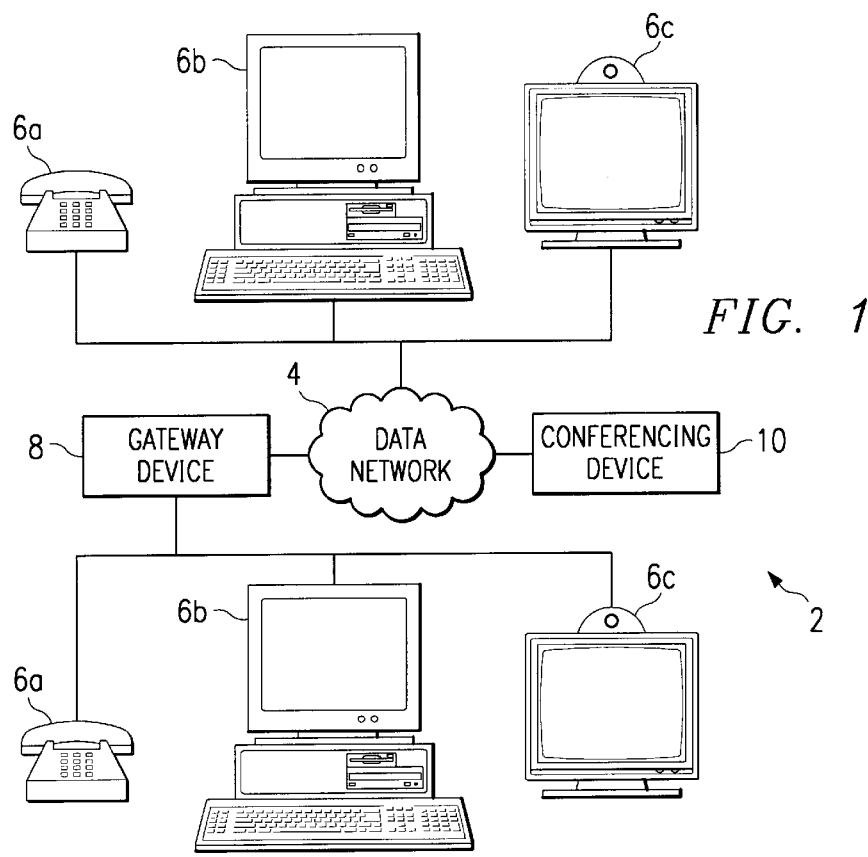
FIG. 1 illustrates a system that supports media conferences using a data network.

FIG. 1 illustrates a system 2 that supports media conferences using a data network 4. A media conference is a real-time or near real-time communication among three or more participants. To establish and maintain media conferences, system 2 includes data network 4, user devices 6a, 6b, and 6c (collectively, end-user devices 6), gateway device 8, and conferencing device 10. End-user devices 6 communicate data streams to conferencing device 10 and receive data streams from conferencing device 10 using data network 4. Conferencing device 10 receives input data streams from end-user devices 6, processes the input data streams to generate output data streams, and communicates the output data streams to end-user devices 6. As described in further detail below with reference to FIG. 2, a system resource management (SRM) module in conferencing device 10 allocates the media conferences to digital signal processors (DSPs) that process the media conferences and migrates media conferences among the DSPs according to the dynamic resource requirements of the media conferences.

End-user devices 6 provide a user interface for conference participants. Each end-user device 6 receives audio, visual, or other sensory input from a conference participant and, in response, generates voice, image, picture, video, or other media information. End-user device 6 communicates an input data stream including the media information to conferencing device 10 and receives from conferencing device 10 an output data stream that conferencing device 10 generates by processing input data streams from other participants' end-user devices 6. Using voice, image, picture, video, or other media information from the output data stream, end-user device 6 produces audio, visual, or other sensory output for a conference participant. In a particular embodiment, end-user device 6 may be a telephone device 6a, a computer 6b, video conferencing equipment 6c, or any other suitable processing or communications device.

Data network 4 communicates data streams between end-user devices 6 and conferencing device 10. More specifically, data network 4 communicates data packets using an Internet protocol, an Ethernet protocol, an Asynchronous Transfer Mode (ATM) protocol, or any other suitable network protocol. Data network 4 may include a local-area network (LAN), a wide-area network (WAN), the Internet, or any other suitable packet-based network. In a particular embodiment, end-user devices 6 are coupled to data network 4 by wireless, wireline, or other suitable communication paths. End-user devices 6 communicate data streams to conferencing device 10 by encapsulating the data streams in data packets and communicating the data packets to data network 4. End-user devices 6 also receive data packets from data network 4 and process the data packets to reconstruct the output data streams generated by conferencing device 10.

In an alternative embodiment, a gateway device 8 links end-user devices 6 to data network 4. Gateway device 8 receives data streams from end-user devices 6, encapsulates the data streams in data packets, and communicates the data packets to conferencing device 10 using data network 4. Gateway device 8 also receives data packets from data network 4, processes the data packets to reconstruct the output data streams generated by conferencing device 10, and communicates the output data streams to end-user devices 6.

FIG. 2 illustrates in more detail conferencing device 10 for processing media conferences. Conferencing device 10 may be either a stand-alone, networked device or a component operating in conjunction with a networked device. In a particular embodiment, conferencing device 10 is a circuit board coupled to a backplane in a networked, telecommunications device. Conferencing device 10 includes digital signal processors (DSPs) 12a, 12b, and 12c (collectively, DSPs 12), a system resource management (SRM) module 14, an interface 16, and a memory 18 coupled together by links 20. Links 20 may be shared or dedicated communication paths that support serial, parallel, or any other suitable form of communication. DSPs 12 receive input data packets from interface 16, process the data packets to reconstruct input data streams generated by end-user devices 6, mix the input data streams to generate output data streams, encapsulate the output data streams in data packets, and communicate the output data packets to end-user devices 6 using interface 16. SRM module 14 allocates media conferences to DSPs 12 and migrates media conferences among DSPs 12 according to the dynamic resource requirements of the media conferences.

Each DSP 12 includes a processing module 22 and a memory 24. Processing module 22 performs various communication and processing operations according to instructions programmed using hardware, software, or a combination of both hardware and software. Memory 24 may include volatile memory, non-volatile memory, or both volatile and non-volatile memory. Although memory 24 appears internal to each DSP 12 in FIG. 2, memory 24 may be internal to or external from each DSP 12 according to particular needs.

In response to SRM module 14 allocating a media conference to DSP 12, processing module 22 creates a conference context for the media conference by devoting memory, processing, or other resources to the media conference. Processing module 22 receives from SRM module 14 initiation information indicating a number of participants in the media conference and, in response, creates in memory 24 one or more jitter buffers 26a, 26b, and 26c (collectively, buffers 26) for each participant. Once DSP 12 begins processing the media conference, processing module 22 will store in each buffer 26 data packets from an associated conference participant and will process the data packets stored in each buffer 26 to reconstruct an input data stream generated by the associated conference participant. Because DSP 12 may support more than one media conference at a time, memory 24 may include several groups 30a, 30b, and 30c (collectively, groups 30) of buffers 26, each group 30 associated with a separate media conference. In a particular embodiment, processing module 22 dynamically allocates memory 24 to create buffers 26 as DSP 12 receives data packets from conference participants. As part of creating a conference context, processing module 22 may also devote particular processing resources to the media conference.

After creating a conference context for a media conference, DSP 12 begins processing the media conference. Processing module 22 receives data packets associated with the conference participants and stores the data packets in buffers 26. To reconstruct the input data streams generated by each participant's end-user device 6, processing module 22 stores the received data packets associated with each conference participant in separate buffers 26. In a particular embodiment, processing module 22 receives a data packet from interface 16, examines the source address of the data packet, identifies one of buffers 26 associated with the source address, and stores the data packet in associated buffer 26. Because the source address of the data packet identifies end-user device 6 that generated the data packet, processing module 22 may use the source address to associate the data packet with a conference participant and to store the data packet in buffer 26 also associated with the conference participant.

To reconstruct the input data streams generated by end-user devices 6, processing module 22 may resequence the received data packets. Because the data packets are transmitted individually over data network 4, the data packets may travel different paths from each end-user device 6 to conferencing device 10. As a result, although the data packets encapsulating each input data stream are typically transmitted sequentially from the same location, the data packets may arrive at conferencing device 10 out of order due to different communication delays associated with the different communication paths in system 2. The received data packets include identifiers that indicate the proper order of the data packets associated with each conference participant, and using the identifiers, processing module 22 resequences the received data packets to place the packets in their proper order. In a particular embodiment, end-user devices 6 or gateway devices 8 sequentially number the data packets associated with each conference participant to allow processing module 22 to resequence data packets received out of order. When processing module 22 receives data packets, processing module 22 may store the data packets in buffers 26 in order of receipt and then later sort the data packets stored in buffers 26 to resequence the data packets. Alternatively, when processing module 22 receives data packets, processing module 22 may initially store the received data packets in buffers 26 in their proper sequence according to the already stored data packets. The latter embodiment avoids the need to later sort the data packets stored in buffers 26 to resequence the data packets.

After re-sequencing the received data packets, processing module 22 may also identify and regenerate missing data packets. By examining the identifiers of the resequenced data packets in buffers 26, processing module 22 can identify missing data packets. If processing module 22 does not receive a missing data packet within a threshold period of time, processing module 22 may regenerate the missing packet based on information included in preceding data packets, succeeding data packets, or both preceding and succeeding data packets. The threshold period of time allows processing module 22 a limited amount of time in which to receive any missing data packets without impairing the real-time quality of the media conference. After expiration of the threshold period of time, processing module 22 continues processing the media conference without the missing packets to maintain the real-time quality of the media conference. In a particular embodiment, instead of regenerating missing data packets, processing module 22 inserts null packets in place of the missing data packets.

Processing module 22 retrieves data packets from buffers 26 and processes the data packets to generate one or more output data streams. First, processing module 22 retrieves data packets from buffers 26 and decodes, or linearizes, the data included in the packets. A data packet typically includes media information encoded in a format that facilitates efficient communication over data network 4. Processing module 22 decodes the data in the data packets to regenerate the encoded media information. For example, in a voice telephone conference, data packets may include voice information encoded according to various standard protocols, such as G.711, G.723, or G.729. In a particular embodiment, a data packet includes compressed data, and processing module 22 decompresses the data before decoding. Processing module 22 then mixes the media information from two or more input data streams associated with a media conference to produce one or more output data streams. In a particular embodiment of a voice telephone conference, processing module 22 produces separate output voice streams for each speaking participant: each speaking participant receives an output voice stream that includes a mix of the other participants' voices but not his or her own voice. Processing module 22 may encode the output data streams for each conference participant according to a coding format and packet size used by the participant's end-user device 6 or gateway device 8. Processing module 22 encapsulates the encoded data streams in data packets and communicates the data packets to interface 16 for further communication to the conference participants.

SRM module 14 allocates media conferences to DSPs 12. SRM module 14 may be implemented in hardware, software stored in a computer readable medium, or both hardware and software. In response to receiving a request to create a new media conference, SRM module 14 selects one of DSPs 12 for service and allocates the new media conference to selected DSP 12 by communicating initiation information to selected DSP 12. As described above, DSP 12 uses the initiation information to create a conference context for the new media conference. After allocating the new media conference to selected DSP 12, SRM module 14 receives data packets associated with the new media conference and communicates the data packets to selected DSP 12. As explained above, DSP 12 processes the data packets to generate output data streams and communicates data packets encapsulating the output data streams to the conference participants using interface 16.

In a particular embodiment, SRM module 14 allocates new media conferences to DSPs 12 according to resource information relating to DSPs 12. Each DSP 12 must devote a minimum amount of memory, processing, or other resources to a media conference for the mixing of data streams to appear transparent or near transparent to conference participants. Otherwise, processing and buffering delays between the receipt of an input data packet and the communication of a corresponding output data packet degrade the quality of service below an acceptable threshold for media conferences. To avoid such a performance degradation, SRM module 14 may allocate new media conferences to DSPs 12 according to resource information relating to DSPs 12.

In response to selecting one of DSPs 12 for service, SRM module 14 examines resource information relating to selected DSP 12. The resource information may identify the amount of resources that DSP 12 already has devoted to existing media conferences, or the resource information may identify an amount of resources available at DSP 12 for processing the new media conference. SRM module 14 may receive the resource information from DSP 12, or SRM module 14 may generate the resource information based on status or other information stored in memory 18. As described in more detail below with reference to FIG. 3, memory 18 may store status, resource, or other information relating to the operation of conferencing device 10. In a particular embodiment, the resource information relates to processing resources, commonly measured in millions of instructions per second (MIPS), and SRM module 14 generates the resource information according to a number of media conferences allocated to DSP 12, a number of participants in each media conference, and the encoding formats used by the participants' end-user devices 6 or gateway devices 8. In such an embodiment, the SRM module 14 may generate the resource information by calculating the number of MIPS required to decode, mix, and encode the data streams associated with each participant in the media conferences allocated to DSP 12. Generally, encoding data streams requires more MIPS than decoding or mixing data streams. For example, processing module 22 may use only 5 MIPS to decode a G.729 data stream and to mix the decoded data stream with other data streams to generate an output data stream, but processing module 22 may need to devote 25 MIPS to encoding the output data stream according to G.729. By calculating the number of MIPS required to support each conference participant, SRM module 14 can generate resource information indicating the number of MIPS devoted to existing media conferences and the number of MIPS available to process new media conferences.

After examining the resource information, SRM module 14 determines whether selected DSP 12 has sufficient resources available to devote to the new media conference. If selected DSP 12 has sufficient available resources according to the resource information, then SRM module 14 may allocate the new media conference to selected DSP 12. Otherwise, SRM module 14 may allocate the new media conference to another DSP 12 with sufficient available resources. In a particular embodiment, SRM module 14 maintains at each DSP 12 a buffer of available resources so that each DSP 12 may process allocated media conferences in a real-time or near real-time manner even if the resource requirements of the media conferences fluctuates. In such an embodiment, SRM module 14 may allocate the new media conference to selected DSP 12 if doing so would not compromise the buffer of available resource at selected DSP 12. In response to allocating the new media conference to selected DSP 12, SRM module 14 modifies the status, resource, or other information stored in memory 18 relating to selected DSP 12 and the new media conference.

SRM module 14 also may migrate media conferences among DSPs 12. As described above, each DSP 12 must devote a minimum amount of memory, processing, or other resources to a media conference for the real-time mixing of data streams to appear transparent or near transparent to conference participants. The resource requirements of a media conference may increase over time. For example, a new participant may join the media conference, or an existing participant may change the coding format used by his or her end-user device 6, communicate additional media information to conferencing device 10, or take other actions that affects the resource requirements of the media conference. SRM module 14 may migrate media conferences among DSPs 12 to ensure that DSPs 12 can meet the changing resource requirements of the media conferences.

In response to an increase in the resource requirements of media conferences allocated to a first DSP 12a, SRM module 14 may migrate a media conference from first DSP 12a to a second DSP 12b to free processing, memory, or other resources at first DSP 12a. SRM module 14 selects a media conference for migration from first DSP 12a and allocates the selected media conference to second DSP 12b by communicating initiation information to second DSP 12b. Using the initiation information, second DSP 12b creates a conference context for the selected media conference. Next, SRM module 14 communicates input data packets associated with participants in the selected media conference to both first DSP 12a and second DSP 12b for a mirroring period of time. As described in further detail below with reference to FIG. 5, although second DSP 12b receives the input data packets, second DSP 12b cannot immediately generate output data streams for communication to the conference participants due to buffering and processing delays. Thus, during the mirroring period, SRM module 14 continues to communicate the input data packets to first DSP 12a so that first DSP 12a can continue to generate output data streams associated with the selected media conference while second DSP 12b fills its buffering and processing pipeline. After the mirroring period, second DSP 12b begins to generate output data streams associated with the media conference, and SRM module 14 may de-allocate the media conference from first DSP 12a. SRM module 14 may stop communicating input data packets associated with the media conference to first DSP 12a and may free processing, memory, or other resources of first DSP 12a previously devoted to supporting the media conference. In a particular embodiment, SRM module 14 de-allocates the media conference from first DSP 12a in response to receiving matching output data packets associated with the media conference from second DSP 12b. In another embodiment, SRM module 14 de-allocates the media conference from first DSP 12a after a pre-determined number of clock cycles. In response to migrating a media conference from first DSP 12a to second DSP 12b, SRM module may modify status, resource, or other information stored in memory 18 relating to first DSP 12a and the migrated media conference.

In a particular embodiment, SRM module 14 may migrate a media conference from first DSP 12a to second DSP 12b according to resource information relating to DSP 12a. As described above, SRM module 14 may receive resource information from first DSP 12a or may generate resource information based on status or other information stored in memory 18. SRM module 14 examines the resource information and, based on the resource information, determines whether to migrate a media conference from first DSP 12a to second DSP 12b. SRM module 14 may examine the resource information in response to receiving a request to add a participant to a media conference allocated to first DSP 12a, and if the resource information indicates that first DSP 12a does not have sufficient resources available to support the new participant, SRM module 14 may migrate a media conference from first DSP 12a to second DSP 12b to free additional processing, memory, or other resources at first DSP 12a. Alternatively, SRM module 14 may maintain a buffer of available resources at first DSP 12a, and if the amount of resources devoted to existing media conferences exceeds a resource threshold or if the amount of available resources drops below a resource threshold, SRM module 14 may migrate a media conference from first DSP 12a to second DSP 12b to restore the buffer of available resources at first DSP 12a. SRM module 14 may evaluate the state of the resource buffer in response to adding a new participant to a media conference, changing a coding format used by a participant, or any other action that substantially affect the resource utilization of first DSP 12a. By migrating media conferences among DSPs 12 according to resource information, SRM module 14 improves resource utilization while allowing conferencing device 10 to adjust to the dynamic resource requirements of the media conferences.

FIG. 3 illustrates a table 30 that includes status information and resource information relating to conferencing device 10. The status information relates to the allocation of media conferences among DSPs 12 in conferencing device 10, and the resource information relates to the utilization of processing and memory resources by DSPs 12 to maintain the media conferences. As described above, SRM module 14 may store the status information and resource information in memory 18. Although FIG. 3 is a table for purposes of illustration, memory 18 may store status and resource information using any suitable data structures and may maintain associations between the data structures using arrays, linked lists, pointers, or any other suitable programming techniques.

A first column 32, a second column 34, and third column 36 store status information relating to the allocation of media conferences to DSPs 12. First column 32 lists media conference identifiers for the media conferences allocated to DSPs 12. Using participant identifiers, second column 34 associates each media conference identified in first column 32 with the participants included in the associated media conference. In the illustrated embodiment, the participant identifiers are IP addresses (shown in dotted decimal notation) assigned to the participants' end-user devices 6. Using DSP identifiers, third column 36 associates each media conference identified in first column 32 with DSP 12 that processes the associated media conference. Although the media conference identifiers and DSP identifiers are numbers and the participant identifiers are IP address in table 30, SRM module 14 may use numbers, letter, addresses, or any other suitable information to identify media conferences, conference participants, and DSPs 12 in conferencing device 10.

SRM module 14 uses the status information stored in table 30 to support the media conferences allocated to DSPs 12. For example, SRM module 14 may use the status information to communicate input data packets to appropriate DSPs 12 in conferencing device 10. In response to receiving an input data packet from interface 16, SRM module 14 may examine the data packet's source address, identify a conference participant associated with the source address using second column 34, identify DSP 12 associated with the conference participant using third column 36, and communicate the input packet to associated DSP 12 for processing.

In table 30, a fourth column 38 and a fifth column 39 store resource information relating to the resource utilization of DSPs 12. Fourth column 38 associates each media conference identified in first column 32 with processing information indicating an amount of processing resources, measured in MIPS, that DSP 12 must devote to the associated media conference for the real-time processing of the media conference to appear transparent or near transparent to conference participants. Fifth column 39 associates each media conference identified in first column 32 with memory information indicating the percentage of memory 24 in DSP 12 that is devoted to maintaining the associated media conference. Although table 30 includes processing and memory information in FIG. 3, table may include information relating to any resources that affect the quality of service provided by DSPs 12.

As described above, SRM module 14 may allocate media conferences to DSPs 12 or migrate media conferences among DSPs 12 according to the resource information stored in table 30. Using column 38, SRM module 14 may calculate to amount of processing resources that DSP 12 is devoting to existing media conferences. For example, DSP 12 associated with identification number "1" is devoting 25 MIPS to media conference "1" and 70MIPS to media conference "2" for a total of 95MIPS. If SRM module 14 sets a resource threshold of 90MIPS, then because 95MIPS exceeds the resource threshold of 90MIPS, SRM module 14 may migrate a media conference from DSP 12 to restore the resource buffer at DSP 12. In a similar manner, SRM module 14 may allocate media conferences to DSPs 12 or migrate media conferences among DSPs 12 according to the memory information stored in column 39.

Figure 4:
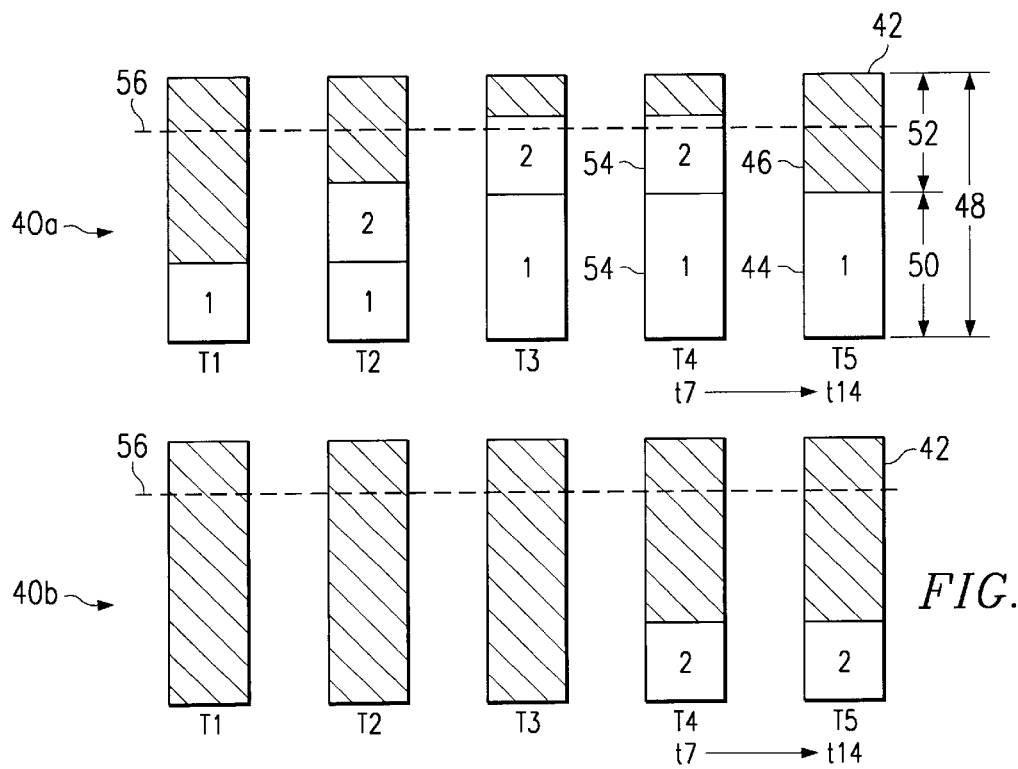
FIG. 4 illustrates two bar graphs demonstrating the resource utilization of two DSPs over time.

FIG. 4 illustrates two bar graphs 40a and 40b that demonstrate the resource utilization of DSPs 12a and 12b, respectively, over time. Bars graphs 40a and 40b represent the utilization of processing, memory, or other resources by DSPs 12a and 12b, respectively. Although bar graphs 40a and 40b include only a single measure of resource utilization, alternative embodiment may use many different measures to separately represent processing, memory, or other resources that affect the quality of service provided by DSPs 12a and 12b. Each bar 42 is divided into a solid bar 44 and a hashed background 46. Solid bar 44 represents the portion of the resources devoted to maintaining existing media conferences, and hashed background 46 represents the portion of the resources available to support new media conferences or new participants in existing media conferences. At each identified time period, bar 42 has a height 48 indicating a total amount of resources, solid bar 44 has a height 50 indicating the amount of resources devoted to maintaining existing media conferences, and hashed background 46 has a height 52 indicating the amount of resources available to support new media conferences or new participants in existing media conferences. Solid bars 44 are sub-divided into one or more segments 54 representing the portion of resources devoted to separate media conferences. In bar graphs 40a and 40b, segments 54 include numbers identifying the separate media conferences. Dotted lines 56 indicate resource thresholds set by SRM module 14. In a particular embodiment, if the amount of resources devoted to existing media conferences exceeds resource threshold 56, then SRM module 14 may migrate a media conference from associated DSP 12.

At time T1, SRM module 14 allocates a first media conference to DSP 12a, and bar graph 40a indicates that DSP 12a devotes a portion of its resources to maintaining the first media conference. In contrast, bar graph 40b indicates that DSP 12b is not utilizing any of its resources. At time T2, SRM module 14 allocates a second media conference to DSP 12a, and bar graph 40a indicates DSP 12a devotes resources to both the first and second media conferences. Again, DSP 12b is not utilizing any of its resources. As shown in bar graphs 40a, the amount of resources required to maintain the first and second media conferences is below resource threshold 56.

At time T3, a new participant joins the first media conference allocated to DSP 12a. As a result of the additional participant, the amount of resources required to support the first and second media conferences exceeds resource threshold 56. As a result, SRM module 14 selects the second media conference to migrate from DSP 12a to DSP 12b to restore a buffer of available resource at DSP 12a. SRM module 14 maintains the buffer of available resource so that DSP 12a may have sufficient resources available to support the first media conference if a new participant joins the media conference or an existing participant changes his or her coding format, communicates an additional data stream, or takes any other action that substantially affects the resource requirement of the media conference. At time T4, both DSP 12a and DSP 12b are using resources to process the second media conference. As described in more detail with reference to FIG. 5, both DSPs 12a and 12b receive input data packets associated with the second media conference during a mirroring period. After the mirroring period, DSP 12b generates output data packets associated with the second media conference, and SRM module 14 de-allocates the second media conference from DSP 12a. At time T5, DSP 12a supports the first media conference, and DSP 12b supports the second media conference. As a result, the resources devoted to the media conferences by DSP 12a and DSP 12b are below resource thresholds 56.

Figure 5:
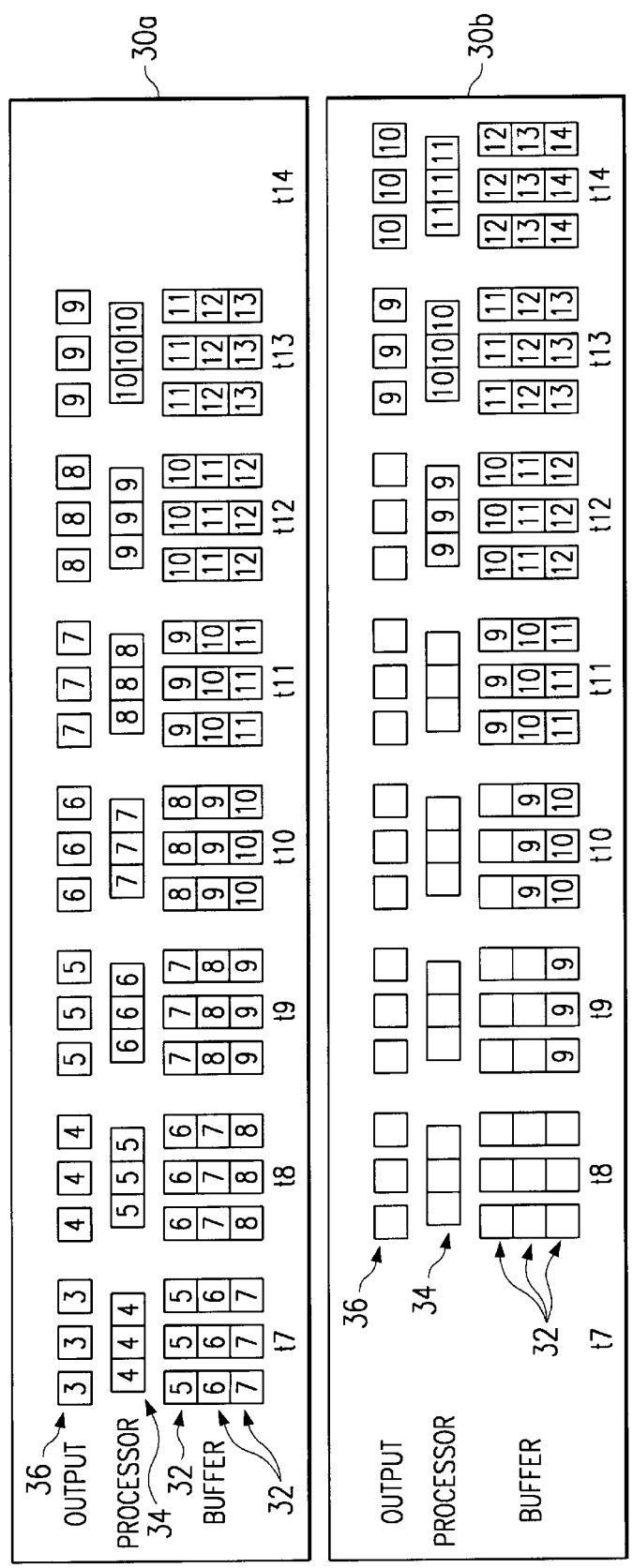
FIG. 5 illustrates a timeline demonstrating the migration of a media conference from one DSP to another over a mirroring time period.

FIG. 5 illustrates a timeline demonstrating the migration of a media conference from one DSP 12a to another DSP 12b over a mirroring time period. Timing diagrams 30a and 30b illustrate the states of DSPs 12a and 12b, respectively. over several time periods (labeled t7 through t14). To demonstrate the migration of a three-participant media conference from DSP 12a to DSP 12b, entries 32 identify data packets stored in buffers 26, entries 34 identify data packets being processed by processing modules 22, and entries 36 identify data packets outputted by DSPs 12a and 12b. To illustrate the movement of data packet through the buffering and processing pipelines of DSPs 12a and 12b, time diagrams 30a and 30b label data packets using numbers that indicate a time period in which DSPs 12a or 12b received the data packets. For purposes of simplifying timing diagrams 30a and 30b, DSPs 12a and 12b store, process, and output the data packets in order of receipt without re-sequencing data packets or regenerating of missing data packets.

At time t7, DSP 12a outputs data packets "3," processes data packets "4" and stores data packets "5," "6," and "7" for later processing. SRM module 14 selects the media conference handled by DSP 12a to migrate to DSP 12b. At time t8, SRM module 14 allocates the media conference to DSP 12b by communicating initiation information to DSP 12b. Using the initiation information, DSP 12b creates a conference context, as indicated by empty entries 32, 34, and 36. Also during this cycle, DSP 12a receives and stores data packets "8" in buffers 26, and the other data packets progress through the buffering and processing pipeline so that DSP 12a outputs data packets "4," processes data packets "5," and stores data packets "6," "7," and "8." At time t9, SRM module 14 begins communicating data packets associated with the selected media conference to both DSPs 12a and 12b, as indicated by data packets "9" stored in jitter buffers 26 for both DSPs 12a and 12b. In addition, DSP 12a outputs data packets "5," processes data packets "6," and stores data packets "7" and "8." As shown, due to the buffering and processing pipeline, DSP 12b cannot immediately generate output data packets in response to receiving data packets "9." Thus, SRM module 14 continues to communicate the input data packets associated with the selected media conference to DSP 12a so that DSP 12a can continue to generate output data packets. During time periods t10 through t12, the data packets progress through the buffering and processing pipelines in DSPs 12a and 12b.

At time t13, both DSPs 12a and 12b output data packets "9," process data packets "10," and store data packets "11," "12," and "13." Because outputs from DSP 12b and 12a match, SRM module 14 de-allocates the media conference from DSP 12a at time t14, as indicated by the absence of entries 32, 34, and 36. At time t14, DSP 12b maintains the media conference by outputting data packets "10," processing data packets "11," and storing data packets "12," "13," and "14."

Figure 6A:
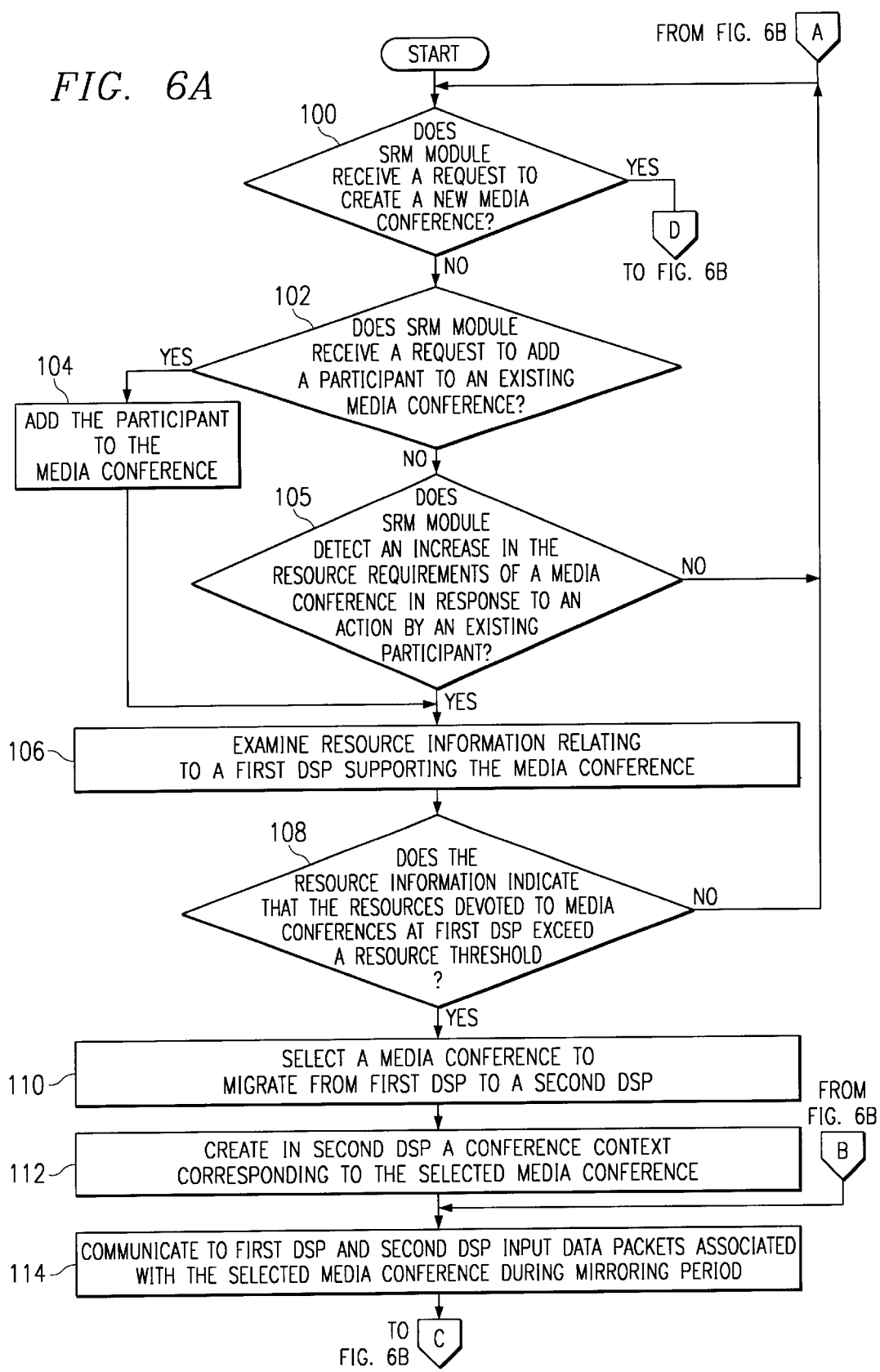

FIG. 6 is a flowchart illustrating a method of allocating media conferences among DSPs 12. The method begins at step 100, where SRM module 14 may receive a request to create a new media conference. If SRM module 14 receives a request to create a new media conference, the method continues at step 124. If SRM module 14 receives a request to add a participant to an existing media conference at step 102, SRM module 14 adds the new participant to the existing media conference at step 104. Because the resource requirements of the media conference increase due to the new participant, the method continues at step 106. Similarly, if SRM module 14 detects an increase in the resource requirements of a media conference in response to an action by an existing participant, the method continues at step 106.

At step 106, SRM module 14 examines resource information relating to first DSP 12a supporting the media conference and, at step 108, determines whether the resource information indicates that the amount of resources devoted to media conferences at first DSP 12a exceeds a resource threshold. If the resources devoted to existing media conferences does not exceed the amount of resource threshold, then the method returns to step 100. Otherwise, to reduce the resources devoted to existing media conferences, SRM module 14 selects a media conference to migrate from first DSP 12a to second DSP 12b at step 110. SRM module 14 creates in second DSP 12b a conference context corresponding to the selected media conference at step 112. During a mirroring period, SRM module 14 communicates to first DSP 12a and second DSP 12b input data packets associated with the selected media conference at step 114, and first DSP 12a generates output data packets associated with the selected media conference at step 116. At step 118, SRM module 14 determines whether second DSP 12b has begun to generate output data packets associated with the selected media conference. If second DSP 12b has not begun to generate output data packets associated with the selected media conference, the method returns to step 114. If second DSP 12b has begun to generate output data packets associated the selected media conference, then SRM module 14 de-allocates the selected media conference from first DSP 12a at step 120, and SRM module 14 receives from second DSP 12b output data packets associated with the selected media conference at step 122. In a particular embodiment, SRM module 14 examines the data packets generated by second DSP 12b and determines whether the data packets match the data packets generated by first DSP 12a. The method returns to step 100.

At step 124, SRM module 14 selects one of DSPs 12 to support the new media conference and examines resource information relating to selected DSP 12 at step 126. At step 128, SRM module 14 determines whether the resource information indicates that selected DSP 12 has sufficient available resources to support the new media conference. If selected DSP 12 does not possess sufficient available resources to support the new media conference, SRM module 14 selects another DSP 12 to support the new media conference at step 130, and the method returns to step 126. If selected DSP has sufficient available resources to support the new media conference, SRM module 14 allocates the new media conference to selected DSP 12 at step 132, and the method returns to step 100.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for maintaining a plurality of media conferences, comprising:
   a plurality of digital signal processors (DSPs), each DSP operable to receive input data packets from conference participants, to process the input data packets to generate output data packets, and to communicate the output data packets to the conference participants; and
   a system resource management (SRM) module coupled to the DSPs and operable to migrate a media conference from a first DSP to a second DSP by allocating the media conference to the second DSP, communicating input data packets associated with the media conference to the first and second DSPs for a mirroring period, and de-allocating the media conference from the first DSP after the mirroring period.

2. The system of claim 1, wherein each DSP comprises:
   a memory operable to store a plurality of buffers associated with one or more media conferences, each buffer including one or more input data packets associated with a media conference; and
   a processing module coupled to the memory and operable to receive data packets from the buffers and to process the data packets to generate one or more output data streams.

3. The system of claim 1, wherein:
   the SRM module allocates the media conference to the second DSP by communicating initiation information to the DSP; and
   the second DSP is further operable to create a conference context for the media conference in response to receiving the initiation information.

4. The system of claim 1, wherein:
   the first DSP communicates output data packets associated with the media conference to end-user devices during the mirroring period; and
   the second DSP communicates output data packets associated with the media conference to end-user devices after the mirroring period.

5. The system of claim 1, wherein the SRM module de-allocates the media conference from the first DSP in response to the second DSP generating output data streams associated with the media conference.

6. The system of claim 1, wherein the SRM module de-allocates the media conference from the first DSP after a predetermined number of clock cycles.

7. The system of claim 1, wherein the SRM module migrates the media conference from the first DSP to the second DSP if resource information related to the first DSP exceeds a resource threshold.

8. The system of claim 7, wherein the resource information relates to a rate of operation required to support the media conferences allocated to the first DSP.

9. The system of claim 7, wherein the resource information is based on a number of media conferences allocated to the first DSP and a number of participants in each media conference.

10. The system of claim 1, wherein the media conference is a voice telephone conference.

11. A method of maintaining a plurality of media conferences using a plurality of digital signal processors (DSPs), comprising:
　　allocating a media conference to a first DSP;
　　allocating the media conference to a second DSP;
　　communicating input data packets associated with the media conference to the first and second DSPs during a mirroring period; and
　　de-allocating the media conference from the first DSP after the mirroring period.

12. The method of claim 11, wherein allocating the media conference to the second DSP further comprises:
　　communicating initiation information to the second DSP; and
　　creating a conference context in the second DSP for the media conference.

13. The method of claim 11, wherein:
　　the first DSP communicates output data packets associated with the media conference to end-user devices during the mirroring period; and
　　the second DSP communicates output data packets associated with the media conference to end-user devices after the mirroring period.

14. The method of claim 11, further comprising de-allocating the media conference from the first DSP in response to the second DSP generating output data packets associated with the media conference.

15. The method of claim 11, further comprising de-allocating the media conference from the first DSP after a predetermined number of clock cycles.

16. The method of claim 11, further comprising:
　　examining resource information relating to the first DSP; and
　　migrating a media conference from the first DSP to the second DSP if the resource information relating to the first DSP exceeds a resource threshold.

17. The method of claim 16, Wherein the resource information relates to a rate of operation required to support the media conferences allocated to the first DSP.

18. The method of claim 16, wherein the resource information is based on a number of media conferences allocated to the first DSP and a number of participants in each media conference.

19. The method of claim 11, wherein the media conference is a voice telephone conference.

20. A system resource management (SRM) module operable to allocate a media conference to a first DSP and to migrate the media conference from the first DSP to a second DSP when resource information relating to the first DSP exceeds a resource threshold.

21. The SRM module of claim 20, wherein the SRM module migrates the media conference from the first DSP to the second DSP by:
　　allocating the media conference to the second DSP;
　　communicating input data packets associated with the media conference to the first and second DSPs for a mirroring period; and
　　de-allocating the media conference from the first DSP after the mirroring period.

22. The SRM module of claim 21, wherein:
　　the SRM module allocates the media conference to the second DSP by communicating initiation information to the second DSP; and
　　the second DSP is further operable to create a conference context for the media conference in response to receiving the initiation information.

23. The SRM module of claim 21, wherein the SRM module receives output data packets associated with the media conference from the first DSP during the mirroring period and receives output data packets associated with the media conference from the second DSP after the mirroring period.

24. The SRM module of claim 22, wherein the SRM module de-allocates the media conference from the first DSP in response to receiving one or more output data packets associated with the media conference from the second DSP.

25. The SRM module of claim 20, wherein the SRM module de-allocates the media conference from the first DSP after a predetermined number of clock cycles.

26. The SRM module of claim 20, wherein the resource information relates to a rate of operation required to support the media conferences allocated to the first DSP.

27. The SRM module of claim 20, wherein the resource information is based on a number of media conferences allocated to the first DSP and a number of participants in each media conference.

28. The SRM module of claim 20, wherein the media conference is a voice telephone conference.

29. Media conference migration software embodied in a computer-readable medium and operable to perform the following steps:
　　allocating a media conference to a first DSP;
　　allocating the media conference to the second DSP;
　　communicating input data packets associated with the media conference to the first and second DSPs during a mirroring period; and
　　de-allocating the media conference from the first DSP after the mirroring period.

30. The media conference migration software of claim 29, wherein allocating the media conference to the second DSP further comprises:
　　communicating initiation information to the second DSP; and
　　creating a conference context in the second DSP for the media conference.

31. The media conference migration software of claim 29, wherein:
　　the first DSP communicates output data packets associated with the media conference to end-user devices during the mirroring period; and
　　the second DSP communicates output data packets associated with the media conference to end-user devices after the mirroring period.

32. The media conference migration software of claim 29, further operable to perform the step of de-allocating the media conference from the first DSP in response to the second DSP generating output data packets associated with the media conference.

33. The media conference migration software of claim 29, further operable to perform the step of de-allocating the media conference from the first DSP after a predetermined number of clock cycles.

34. The media conference migration software of claim 29, further operable to perform the steps of:
　　examining resource information relating to the first DSP; and
　　migrating a media conference from the first DSP to the second DSP if the resource information relating to the first DSP exceeds a resource threshold.

35. The media conference migration software of claim 34, wherein the resource information relates to a rate of operation required to support the media conferences allocated to the first DSP.

36. The media conference migration software of claim 34, wherein the resource information is based on a number of media conferences allocated to the first DSP and a number of participants in each media conference.

37. The media conference migration software of claim 29, wherein the media conference is a voice telephone conference.

38. A system for maintaining a plurality of media conferences, comprising:
means for allocating a media conference to a first DSP;
means for allocating the media conference to a second DSP;
means for communicating input data packets associated with the media conference to the first and second DSPs during a mirroring period; and
means for de-allocating the media conference from the first DSP after the mirroring period.

39. A system for maintaining a plurality of media conferences, comprising:
a plurality of digital signal processors (DSPs), each DSP operable to receive input data packets from conference participants, to process the input data packets to generate output data packets, and to communicate the output data packets to the conference participants and wherein each DSP comprises:
a memory operable to store a plurality of buffers associated with one or more media conferences, each buffer including one or more input data packets associated with a media conference;
a processing module coupled to the memory and operable to receive data packets from the buffers and to process the data packets to generate one or more output data streams; and
a system resource management (SRM) module coupled to the DSPs and operable to migrate a media conference from a first DSP to a second DSP.

40. The system of claim 39, wherein the SRM module de-allocates the media conference from the first DSP in response to the second DSP generating output data streams associated with the media conference.

41. The system of claim 39, wherein the SRM module de-allocates the media conference from the first DSP after a predetermined number of clock cycles.

42. The system of claim 39, wherein the SRM module migrates the media conference from the first DSP to the second DSP if resource information related to the first DSP exceeds a resource threshold.

43. The system of claim 42, wherein the resource information relates to a rate of operation required to support the media conferences allocated to the first DSP.

44. The system of claim 42, wherein the resource information is based on a number of media conferences allocated to the first DSP and a number of participants in each media conference.

45. A system for maintaining a plurality of media conferences, comprising:
a plurality of digital signal processors (DSPs), each DSP operable to receive input data packets from conference participants, to process the input data packets to generate output data packets, and to communicate the output data packets to the conference participants; and
a system resource management (SRM) module coupled to the DSPs and operable to:
migrate a media conference from a first DSP to a second DSP; and
de-allocate the media conference from the first DSP in response to the second DSP generating output data streams associated with the media conference.

46. The system of claim 45, wherein the SRM module de-allocates the media conference from the first DSP in response to the second DSP generating output data streams associated from the first DSP and a predetermined number of clock cycles elapsing.

47. The system of claim 45, wherein the SRM module migrates the media conference from the first DSP to the second DSP if resource information related to the first DSP exceeds a resource threshold.

48. The system of claim 47, wherein the resource information relates to a rate of operation required to support the media conferences allocated to the first DSP.

49. The system of claim 47, wherein the resource information is based on a number of media conferences allocated to the first DSP and a number of participants in each media conference.

50. A system for maintaining a plurality of media conferences, comprising:
a plurality of digital signal processors (DSPs), each DSP operable to receive input data packets from conference participants, to process the input data packets to generate output data packets, and to communicate the output data packets to the conference participants; and
a system resource management (SRM) module coupled to the DSPs and operable to:
migrate a media conference from a first DSP to a second DSP; and
de-allocate the media conference from the first DSP after a predetermined number of clock cycles.

51. The system of claim 50, wherein the SRM module migrates the media conference from the first DSP to the second DSP if a resource information related to the first DSP exceeds a resource threshold.

52. The system of claim 51, wherein the resource information relates to a rate of operation required to support the media conferences allocated to the first DSP.

53. The system of claim 51, wherein the resource information is based on a number of media conferences allocated to the first DSP and a number of participants in each media conference.

54. A system for maintaining a plurality of media conferences, comprising:
a plurality of digital signal processors (DSPs), each DSP operable to receive input data packets from conference participants, to process the input data packets to generate output data packets, and to communicate the output data packets to the conference participants; and
a system resource management (SRM) module coupled to the DSPs and operable to migrate a media conference from a first DSP to a second DSP if a resource information related to the first DSP exceeds a resource threshold.

55. The system of claim 54, wherein the resource information relates to a rate of operation required to support the media conferences allocated to the first DSP.

56. The system of claim 54, wherein the resource information is based on a number of media conferences allocated to the first DSP and a number of participants in each media conference.

57. A method of maintaining a plurality of media conferences using a plurality of digital signal processors (DSPs), comprising:
allocating a media conference to a first DSP;
migrating the media conference from the first DSP to a second DSP; and
de-allocating the media conference from the first DSP in response to the second DSP generating output data packets associated with the media conference.

58. The method of claim 57, wherein de-allocating the media conference comprises de-allocating the media conference from the first DSP in response to the second DSP generating output data packets associated with the media conference and after a predetermined number of clock cycles elapse.

59. The method of claim 57, further comprising examining resource information relating to the first DSP; and wherein migrating a media conference from the first DSP to the second DSP comprises migrating a media conference from the first DSP to the second DSP if the resource information relating to the first DSP exceeds a resource threshold.

60. The method of claim 59, wherein the resource information relates to a rate of operation required to support the media conferences allocated to the first DSP.

61. The method of claim 59, wherein the resource information is based on a number of media conferences allocated to the first DSP and a number of participants in each media conference.

62. A method of maintaining a plurality of media conferences using a plurality of digital signal processors (DSPs), comprising:
   allocating a media conference to a first DSP;
   migrating the media conference from the first DSP to a second DSP; and
   de-allocating the media conference from the first DSP after a predetermined number of clock cycles.

63. The method of claim 42, further comprising examining a resource information relating to the first DSP; and wherein migrating a media conference from the first DSP to the second DSP comprises migrating a media conference from the first DSP to the second DSP if the resource information relating to the first DSP exceeds a resource threshold.

64. The method of claim 63, wherein the resource information relates to a rate of operation required to support the media conferences allocated to the first DSP.

65. The method of claim 63, wherein the resource information is based on a number of media conferences allocated to the first DSP and a number of participants in each media conference.

66. A method of maintaining a plurality of media conferences using a plurality of digital signal processors (DSPs), comprising:
   allocating a media conference to a first DSP;
   examining a resource information relating to the first DSP; and
   migrating the media conference from the first DSP to a second DSP, if the resource information relating to the first DSP exceeds a resource threshold.

67. The method of claim 66, wherein the resource information relates to a rate of operation required to support the media conferences allocated to the first DSP.

68. The method of claim 66, wherein the resource information is based on a number of media conferences allocated to the first DSP and a number of participants in each media conference.

69. Media conference migration software embodied in a computer-readable medium and operable to perform the following steps:
   allocating a media conference to a first DSP;
   migrating the media conference from the first DSP to a second DSP; and
   de-allocating the media conference from the first DSP in response to the second DSP generating output data packets associated with the media conference.

70. The media conference migration software of claim 69, wherein the media conference migration software is operable to de-allocate the media conference from the first DSP by de-allocating the media conference from the first DSP in response to the second DSP generating output data packets associated with the media conference and a predetermined number of clock cycles elapsing.

71. The media conference migration software of claim 69, further operable to perform the steps of:
   examining resource information relating to the first DSP; and
   migrating a media conference from the first DSP to the second DSP if the resource information relating to the first DSP exceeds a resource threshold.

72. The media conference migration software of claim 71, wherein the resource information relates to a rate of operation required to support the media conferences allocated to the first DSP.

73. The media conference migration software of claim 71, wherein the resource information is based on a number of media conferences allocated to the first DSP and a number of participants in each media conference.

74. Media conference migration software embodied in a computer-readable medium and operable to perform the following steps:
   allocating a media conference to a first DSP;
   migrating the media conference from the first DSP to a second DSP; and
   de-allocating the media conference from the first DSP after a predetermined number of clock cycles elapsing.

75. The media conference migration software of claim 74, further operable to perform the steps of:
   examining resource information relating to the first DSP; and
   migrating a media conference from the first DSP to the second DSP if the resource information relating to the first DSP exceeds a resource threshold.

76. The media conference migration software of claim 75, wherein the resource information relates to a rate of operation required to support the media conferences allocated to the first DSP.

77. The media conference migration software of claim 75, wherein the resource information is based on a number of media conferences allocated to the first DSP and a number of participants in each media conference.

78. Media conference migration software embodied in a computer-readable medium and operable to perform the following steps:
   allocating a media conference to a first DSP;
   examining resource information relating to the first DSP; and
   migrating the media conference from the first DSP to a second DSP if the resource information relating to the first DSP exceeds a resource threshold.

79. The media conference migration software of claim 78, wherein the resource information relates to a rate of operation required to support the media conferences allocated to the first DSP.

80. The media conference migration software of claim 78, wherein the resource information is based on a number of media conferences allocated to the first DSP and a number of participants in each media conference.

* * * * *

UNITED STATES PATENT AND TRADEMARK OFFICE
CERTIFICATE OF CORRECTION

PATENT NO. : 6,744,741 B1
DATED : June 1, 2004
INVENTOR(S) : Ju et al.

It is certified that error appears in the above-identified patent and that said Letters Patent is hereby corrected as shown below:

<u>Column 14,</u>
Line 7, after "claim", delete "22", and insert -- 20 --.

<u>Column 17,</u>
Line 29, after "claim" delete "42" and insert -- 62 --.

Signed and Sealed this

Twelfth Day of October, 2004

JON W. DUDAS
*Director of the United States Patent and Trademark Office*